United States Patent [19]
Mahony

[11] Patent Number: 5,524,629
[45] Date of Patent: Jun. 11, 1996

[54] COLOR FLOW PROCESSOR HAVING ADAPTIVE WALL FILTER

[75] Inventor: John E. Mahony, Whitefish Bay, Wis.

[73] Assignee: General Electric Company, Milwaukee, Wis.

[21] Appl. No.: 345,872

[22] Filed: Nov. 25, 1994

Related U.S. Application Data

[63] Continuation-in-part of Ser. No. 333,184, Nov. 2, 1994, Pat. No. 5,445,156.

[51] Int. Cl.$^6$ ........................................ A61B 8/00
[52] U.S. Cl. ........................................ 128/661.08
[58] Field of Search ................ 128/661.01, 661.08, 128/661.09, 661.10; 73/625, 626, 801.25; 364/413.25

[56] References Cited

U.S. PATENT DOCUMENTS 5,357,965  10/1994  Hall et al. ..................... 128/661.08

*Primary Examiner*—George Manuel
*Attorney, Agent, or Firm*—Dennis M. Flaherty; John H. Pilarski

[57] ABSTRACT

A color flow processor for color flow imaging of the velocity of scatterers flowing past slowly moving tissue. The processor has inputs for receiving basebanded signals derived from ultrasound reflected by the scatterers and by the slowly moving tissue; a wall estimator for processing the basebanded signals to output a wall frequency signal representing an estimated means Doppler frequency produced by the slowly moving tissue and a wall velocity signal representing an estimated velocity of the slowly moving tissue; a complex mixer for mixing the basebanded signal using the wall frequency signal so that the wall component is at DC and then outputting the mixed basebanded signals; and a flow estimator for processing the mixed basebanded signals and the wall velocity signal in an adaptive mode to output a flow velocity signal representing an estimated flow velocity of the scatterers which compensates for movement of the slowly moving tissue.

14 Claims, 15 Drawing Sheets

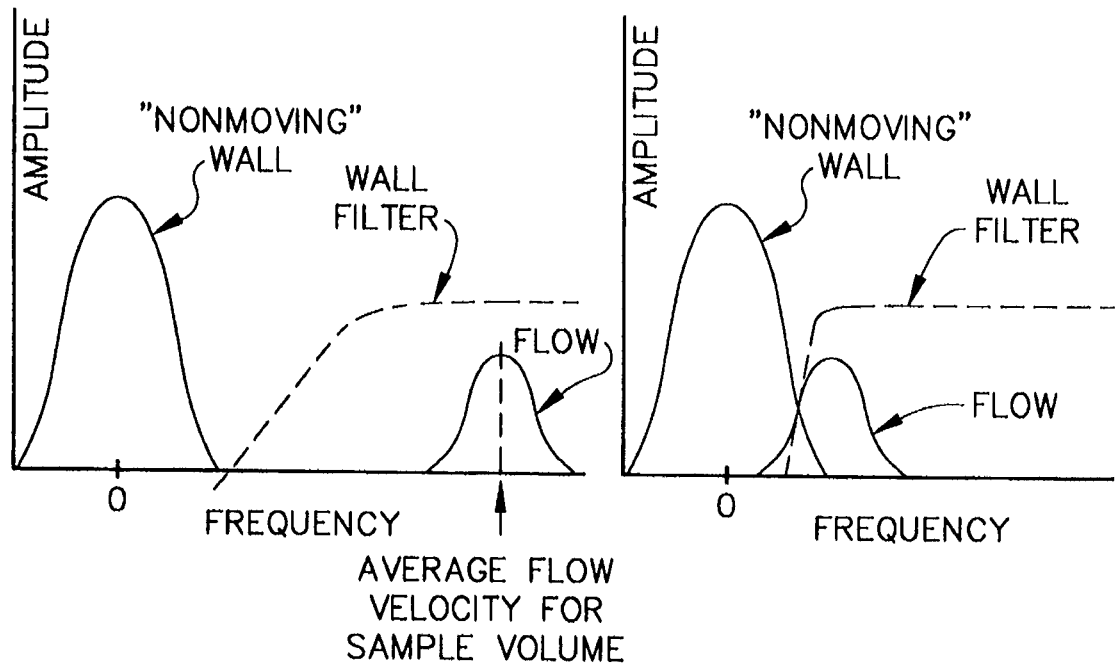
FIG. 3A
FIG. 4A
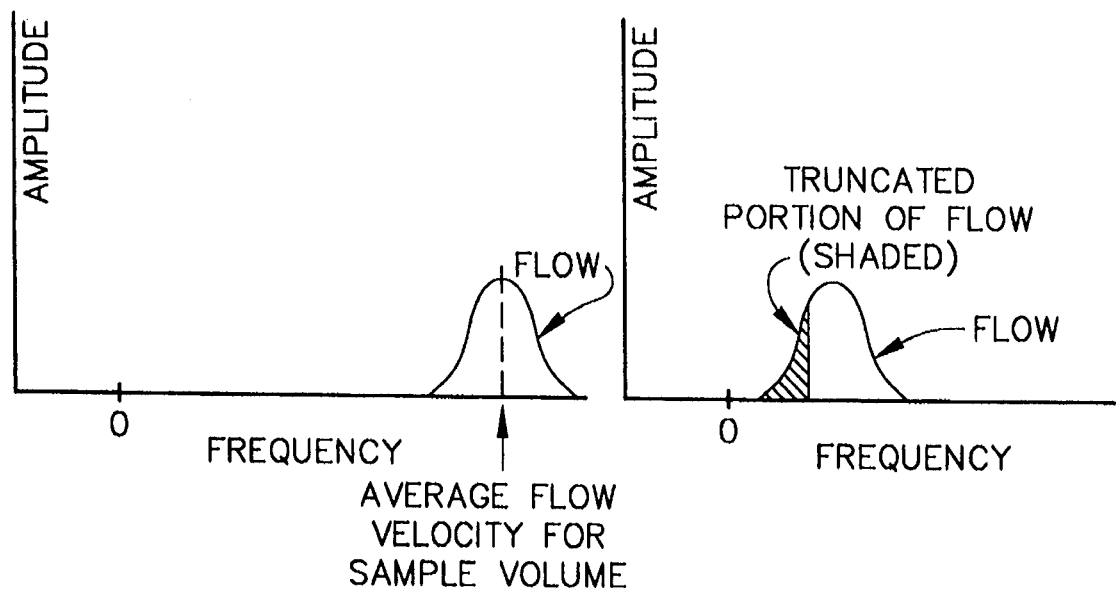
FIG. 3B
FIG. 4B

COLOR FLOW PROCESSOR HAVING ADAPTIVE WALL FILTER

RELATED APPLICATION

This is a continuation-in-part of U.S. patent application Ser. No. 08/333,184, filed on Nov. 2, 1994 now U.S. Pat. No. 5,445,156 and entitled "Method for Adaptively Filtering Doppler Signals Using a Complex Time Domain Filter", now U.S. Pat. No. 5,349,524.

FIELD OF THE INVENTION

This invention generally relates to ultrasound color flow Doppler imaging of fluid flow fields. In particular, the invention relates to imaging blood flow in the human body by detecting Doppler shifting of ultrasonic echoes reflected from the flowing blood.

BACKGROUND OF THE INVENTION

The most common modes of diagnostic ultrasound imaging include B- and M-modes (used to image internal, physical structure), Doppler, and color flow (primarily used to image flow characteristics, such as in blood vessels). Color flow mode is typically used to detect the velocity of blood flow toward/away from the transducer, and it essentially utilizes the same technique as is used in Doppler mode. Whereas Doppler mode displays velocity versus time for a single selected sample volume, color flow mode displays hundreds of adjacent sample volumes simultaneously, all laid over a B-mode image and color-coded to represent each sample volume's velocity.

Measurement of blood flow in the heart and vessels using the Doppler effect is well known. Whereas the amplitude of the reflected waves is employed to produce black and white images of the tissues, the frequency shift of backscattered waves may be used to measure the velocity of the backscatterers from tissue or blood. The change or shift in backscattered frequency increases when blood flows toward the transducer and decreases when blood flows away from the transducer. Color flow images are produced by superimposing a color image of the velocity of moving material, such as blood, over the black and white anatomical image. The measured velocity of flow at each pixel determines its color.

A major difficulty in making Doppler effect measurements of reflected ultrasonic waves from blood is that the received echo signal typically contains a large component produced by stationary or slowly moving tissues, whereas blood reflects ultrasound very weakly. The stationary tissues do not produce any frequency shift in the reflected waves and these components can easily be filtered out without affecting the flow measurement. However, the reflections produced by the moving tissue due to cardiac or respiratory motion are frequency shifted and may completely overwhelm signals from slowly flowing blood.

In standard color flow processing, a high pass filter known as a wall filter is applied to the data before a color flow estimate is made. The purpose of this filter is to remove signal components produced by tissue surrounding the blood flow of interest. If these signal components are not removed, the resulting velocity estimate will be a combination of the velocities from the blood flow and the surrounding tissue. The backscatter component from tissue is many times larger than that from blood, so the velocity estimate will most likely be more representative of the tissue, rather than the blood flow. In order to get the flow velocity, the tissue signal must be filtered out.

When a high-flow-velocity area (such as a blood vessel) is imaged in color flow mode, each of the sample volumes has a frequency response similar to that of FIG. 3A. The region of high amplitude centered around the zero frequency represents the presence of some fairly non-moving structure (typically a blood vessel wall), while the region of somewhat less amplitude centered around some relatively high frequency represents the presence of high flow velocity (typically blood flow). Because of the large difference in frequency between the non-moving structure and the fast-moving blood flow, it is very easy to use a "wall filter" as shown in FIG. 3A to produce the output shown in FIG. 3B, where the portion of the frequency response corresponding to the non-moving wall has been eliminated. After such wall filtering, some scheme of determining the maximum remaining amplitude (i.e., that of the high-velocity blood flow) can be utilized so that the flow velocity for that particular sample volume can be displayed.

However, a problem arises in applying wall filtering in low-flow-velocity imaging. FIG. 4A shows a typical frequency response for a sample volume in a low-flow-velocity region. Since the frequencies of the non-moving wall and the slow-moving flow are close together, it is difficult to effectively apply a wall filter to eliminate the "wall" response without resulting in a distorted slow-flow response portion (see FIG. 4B).

Most commonly, color flow processors assume that the large signal returning from the surrounding tissue is static, that is the tissue is not moving. If this is the case, the in-phase and quadrature I and Q data can be filtered separately with simple real filters which remove the DC component and very low frequencies. The cutoff frequency of these high pass filters can be varied for a given application by changing the filter coefficients.

The assumption of static tissue is generally a good one for radiology applications, except in the abdomen, where residual respiratory and cardiac motion cause some amount of tissue motion. In addition, the motion of the handheld transducer will also look like tissue motion. Since the velocity of this motion is usually slow compared to the velocity of the blood flow being imaged, the operator can set the wall filter cutoff frequency high enough to filter out the tissue signal component. Filtering in this way, however, will also remove signals from low-velocity blood flow, which are often the signals that the operator wants to image.

Some prior art systems provide a wall filter which is manually adjusted by the operator to filter out a narrow band of frequencies in the echo signal centered on the carrier frequency where static signals lie. The operator must adjust the bandwidth of this filter so that the reflected signals from the slow moving wall are eliminated without distorting the measurement of blood flow. If the filter bandwidth is set too wide, signals from slowly moving blood may be eliminated. In addition, the filter setting is static and is applied over the whole image. As a result, the filter may work adequately at some locations in the field of view of the image, but not at other locations.

The processing approach described in U.S. patent application Ser. No. 08/001,998 uses adaptive wall filtering, which is performed by mixing the wall signal down to zero frequency and then removing the wall signal using a real time domain filter to filter the I data and the Q data. This reduces the amplitude of the wall signal and allows the flow signal to be detected with greater accuracy, and at lower velocities than without this method. The adaptive wall filter automatically adjusts its center frequency and bandwidth as a function of the received echo signal. A complex mixer receives the received echo signal and outputs a modified echo signal which is shifted in frequency by an amount which is equal to and opposite to the mean frequency of the received echo signal. The wall filter receives the modified echo signal and filters out a band of frequencies determined by the variance of the received echo signal. By automatically shifting the frequency of the received echo signal by an amount opposite to its measured mean frequency, the signal components therein due to slowly moving tissue are effectively shifted to the center of the filter. By automatically controlling the width of the stop band of the filter in dependence on the measured variance, the signal components produced by slowly moving tissue are filtered out. The filter output is then processed in a conventional manner to produce a color signal indicative of flow velocity.

SUMMARY OF THE INVENTION

The present invention is a hardware implementation of an adaptive color flow scheme that is effective for removing the wall response in low flow velocity imaging. The hardware includes a processor for color flow imaging of the velocity of scatterers flowing past slowly moving tissue. The processor incorporates means for supplying basebanded signals derived from ultrasound reflected by the scatterers and by the tissue; a wall estimator for processing the basebanded signals to output a wall frequency signal representing an estimated means Doppler frequency produced by the slowly moving tissue and a wall velocity signal representing an estimated velocity of the slowly moving tissue; a complex mixer for mixing the basebanded signal using the wall frequency signal so that the wall component is at DC and then outputting the mixed basebanded signals; and a flow estimator for processing the mixed basebanded signals and the wall velocity signal in an adaptive mode to output a flow velocity signal representing an estimated flow velocity of the scatterers which compensates for movement of the slowly moving tissue.

BRIEF DESCRIPTION OF THE DRAWINGS

FIGS. 3A and 3B are graphic illustrations of the frequency response for a high-flow-velocity region in the color flow mode, before and after application of a wall filter, respectively.

FIGS. 4A and 4B are graphic illustrations of the frequency response for a low-flow-velocity region in the color flow mode, before and after application of a wall filter, respectively.

DETAILED DESCRIPTION OF THE PREFERRED EMBODIMENTS

Figure 1:
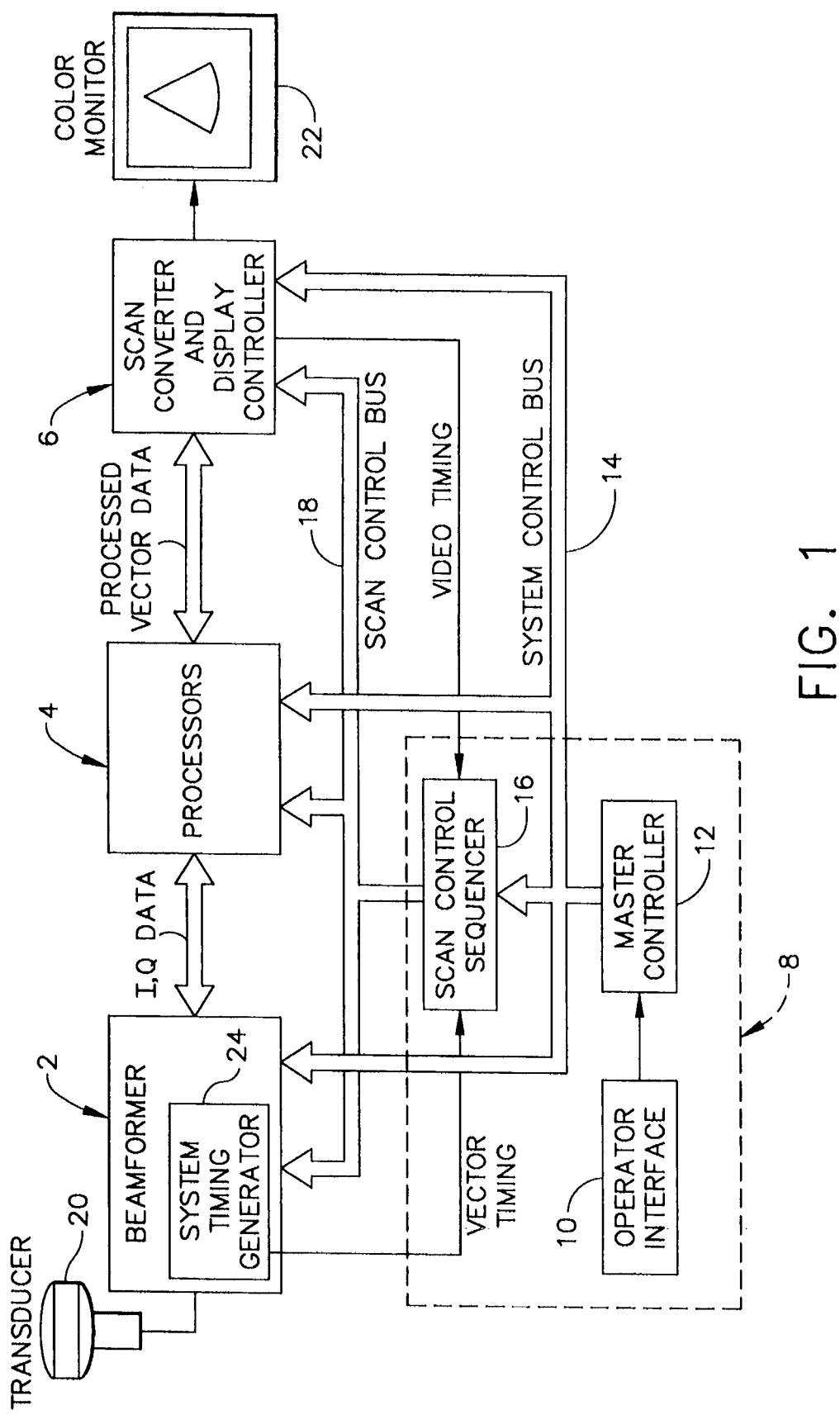
FIG. 1 is a block diagram showing major functional subsystems within a real-time ultrasound imaging system.

FIG. 1 depicts an ultrasound imaging system consisting of four main subsystems: a beamformer 2, processors 4 (including a separate processor for each different mode), a scan converter/display controller 6 and a kernel 8. System control is centered in the kernel, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface from the master controller to the subsystems. The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. The scan converter broadcasts the vector parameters defined by the host to the subsystems via scan control bus 18.

The main data path begins with the analog RF inputs to the beamformer 2 from the transducer 20. The beamformer 2 outputs two summed digital baseband I,Q receive beams. The I,Q data is input to a processor 4, where it is processed according to the acquisition mode and output as processed vector (beam) data to the scan converter/display processor 6. The scan converter accepts the processed vector data and outputs the video display signals for the image to a color monitor 22.

Figure 2:
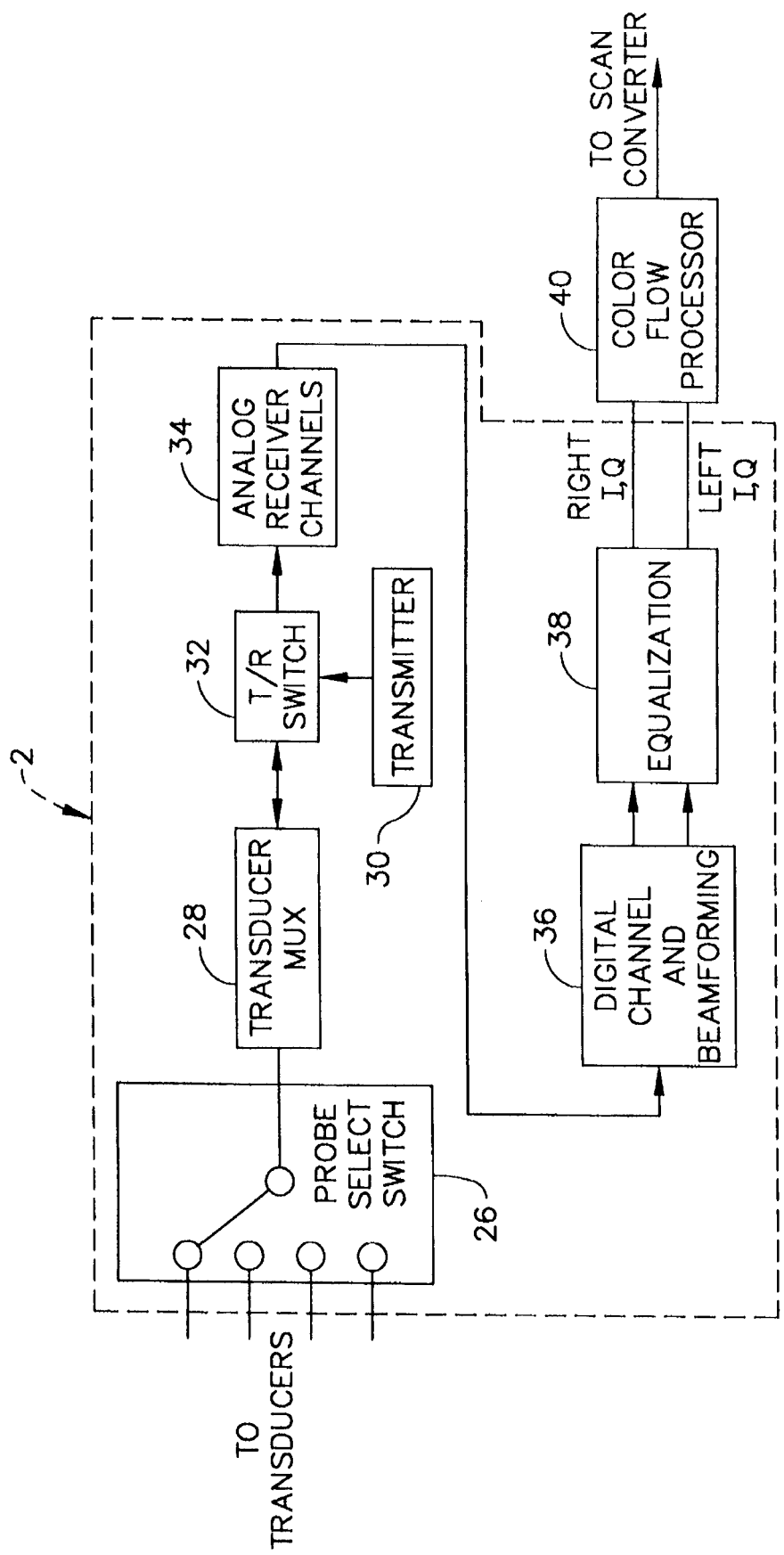
FIG. 2 is a block diagram of a single channel processing path in the beamformer shown in FIG. 1.

Referring to FIG. 2, the beamformer 2 is responsible for the transmit and receive beamforming. It includes a probe select switch 24 for activating one of a plurality of transducers. The transducer multiplexer 28 is responsible for multiplexing the 128 beamformer channels to up to 256 transducer elements.

Each transducer includes an array of separately driven transducer elements, each of which produces a burst of ultrasonic energy when energized by a pulsed waveform produced by a transmitter 30. The ultrasonic energy reflected back to the transducer array from the object under study is converted to an electrical signal by each receiving transducer element and applied separately to an analog receiver channels 34 through a set of transmit/receive (T/R) switches 32. Transmitter 30, receiver channels 34 and switches 32 are operated under control of a front end controller (not shown) in the beamformer. A complete scan is performed by acquiring a series of echoes in which switches 32 are set to their transmit position, transmitter 30 is gated ON momentarily to energize each transducer element, switches 32 are then set to their receive position, and the subsequent echo signals produced by each transducer element are applied to the respective receiver channels 34.

The receive waveform for each channel is amplified and digitized after being filtered to prevent aliasing. The digitized channel signal is then demodulated and filtered by the digital channel and beamforming circuitry 36 to form I and Q baseband signals. These baseband signals are appropriately delayed by a combination of time delay and phase rotation, appropriately scaled (amplified) and then pipeline summed with the appropriately delayed signals from the other channels to accomplish the steering and focusing of the receive beam. The baseband I and Q pair can optionally be delayed by two different phase rotations before summation to simultaneously form two separately steered receive beams from the same transmit beam. These two beams are known as the left and right beams and are subsequently summed and processed separately. The summed left and right I and Q signals are then digitally gained, windowed, frequency shifted and filtered by the equalization board 38 to provide an optimal beamformed signal which is output to the processors, e.g., the color flow processor 40.

The color flow processor 40 is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

The color flow processor 40 is responsible for processing demodulated I and Q data streams for the right and left beams into an estimate of flow parameters for each range cell (combination of vector number and depth that defines a point in the object being imaged). This information is then passed out directly as B mode data, or accumulated over time to generate estimates of flow parameters for each range cell for M mode data.

Figure 5:
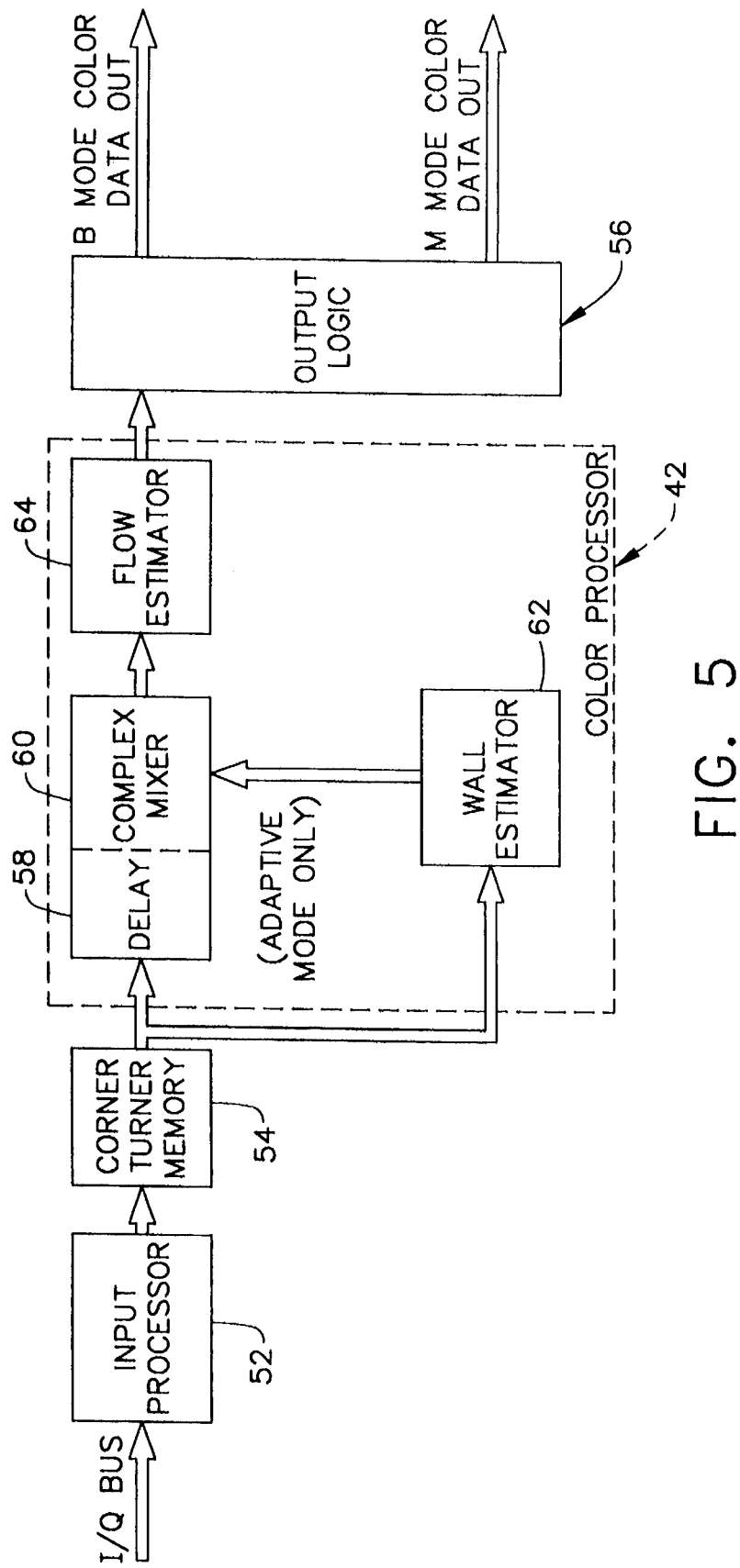
FIG. 5 is a top level block diagram of a color flow processing system in accordance with the preferred embodiment of the invention.

Referring to FIG. 5, the input processor 52 receives the right and left beam data from the I and Q buses and performs a programmable noninteger decimation on the incoming data. The downsampled data is stored in a corner turner memory 54, whose purpose is to buffer data from possibly interleaved firings and output the data as vectors of points across firings at a given range cell. Data is received in "fast time", or sequentially downrange (along a vector) for each firing. The output of the corner turner memory is reordered into "slow time", or sequentially by firing for each range cell.

The color processor 52 receives I and Q data and control signals from the corner turner memory. In the color processor, the flow estimator 64 filters the I and Q signals to remove the wall signal (stationary or slowly moving signals), and converts the range cell information into the intermediate autocorrelation parameters N, D, and R(0) for each range cell. For high-flow-velocity studies, the filter in the flow estimator is capable of removing the wall signal before performing the flow estimate. For low-flow-velocity cases, the flow signal is very close to the wall signal and may be partially removed by a wall filter with fixed parameters. In this case, the wall estimator 62 is used to estimate the characteristics of the wall. The wall signal center frequency is estimated and used to mix the data, which has been delayed by delay 58, in the mixer 60 so the wall signal is centered at DC. This allows the wall signal to be removed more effectively. The result of this adjustment is that a better estimate of low-velocity flow is made. The adaptive adjustments can be made as often as every range cell. This section also provides R(0), an estimate of the power based on a summation of $I^2+Q^2$ after the wall filter. The power is estimated by scaling R(0) by the amount of the shift applied by the normalizer block. The parameter estimation uses a coordinate transform processor and look-up tables to estimate correlation power, velocity, and turbulence values for each range cell in the vector. The velocity is estimated from the phase of the autocorrelation function, and the turbulence is estimated from the variance of the mean Doppler frequency. The color estimates are sent to the output logic 56 for further processing. Separate output paths are provided for B and M modes.

The output logic 56 converts the power, velocity, and turbulence signals into an 8-bit and a 4-bit output. Power thresholding is also applied. The outputs are selectable by the host processor between power, velocity, and turbulence estimates. The transfer of data is performed automatically as vector information is processed. For B mode, the data is sent to the color acoustic line memory (CALM) (not shown) for scan conversion and display. For M mode, the data is buffered and sent to the time line memory (not shown) for scan conversion and display. A median filter can be applied to the data. The transfer of data is synchronized with the external request from the time line memory board. M mode processing will always be done in non-adaptive mode, since M mode is used in high-flow-velocity studies (cardiac).

Control of the color flow processor is relatively complex. The size of the firing group can vary over a large range, and the pipeline delay of the processor is longer than the minimum group size. These two factors mean that the color flow processor can have several color vectors at different stages of processing in the pipeline at the same time. This also means that the output is delayed significantly from the input.

Again referring to FIG. 1, the scan control bus 18 carries information from the scan control sequencer 16 about the type of vector being fired. This information, plus parameters downloaded from the master controller 12, are used to control the operation of the color flow processor. One of four programmable vector types can be selected at any time by two function code bits. These two bits select from one of four sets of control registers. The pipeline delays mean that the control signals must be pipelined through the processor to match the data. The select signals are pipelined through the processor to allow different operations to occur at different stages in the pipeline. In addition, due to the need to accumulate a full group of firings before processing can commence, the control information (vector tags, etc.) is buffered along with the data.

Figure 7:
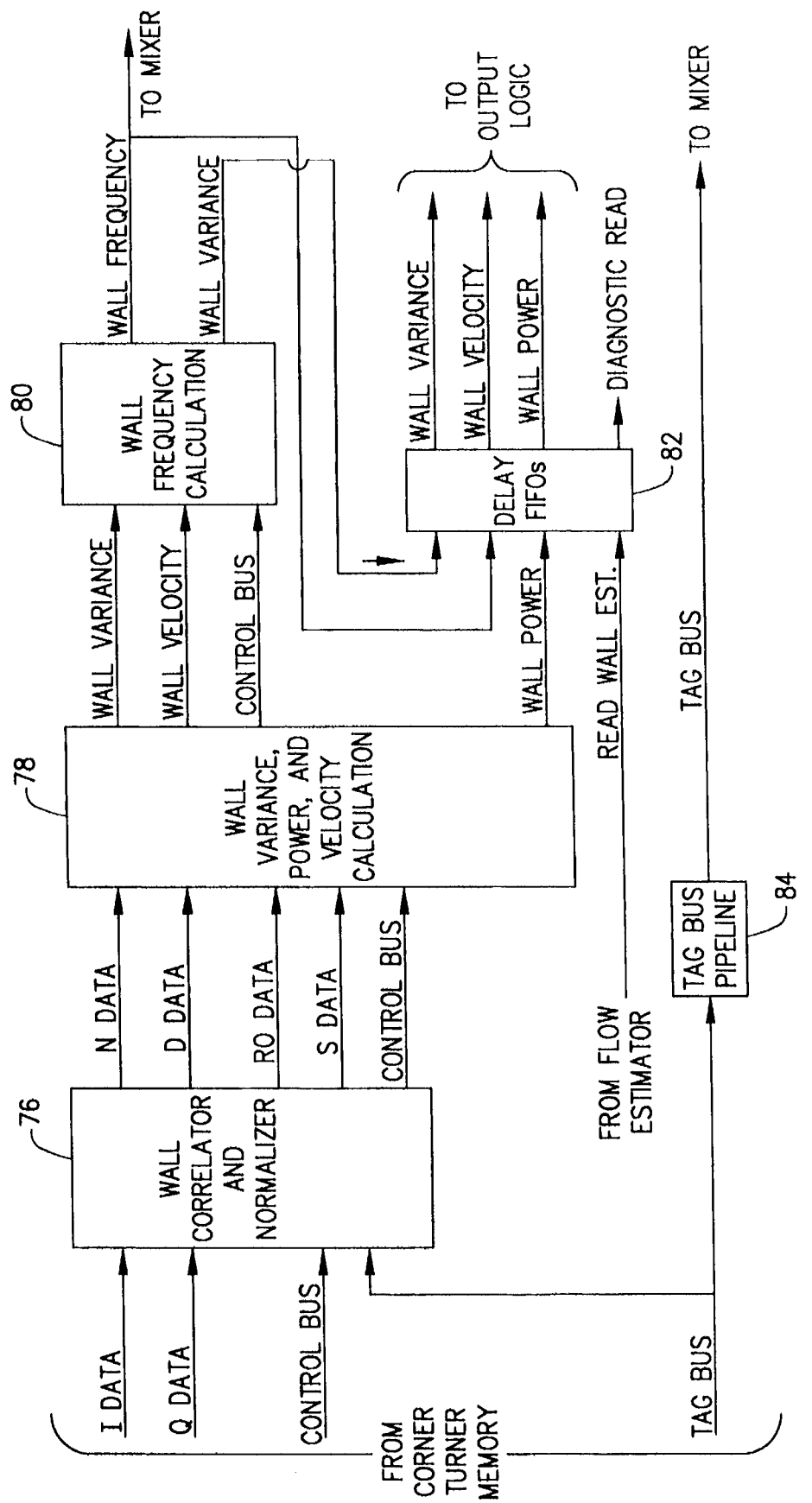
FIG. 7 is a block diagram of the wall estimator incorporated in the color processor of FIG. 6, with portions thereof being shown in FIGS. 7A–7C.

Referring to FIG. 7, the color processor consists of three major blocks: the wall estimator 62, the mixer 60, and the flow estimator 64. Two basic operating modes are supported by the color processor: non-adaptive and adaptive. Non-adaptive mode processes the incoming I and Q data into estimates of the flow parameters; this is done by the flow estimator. Adaptive mode is used in low-flow-velocity cases to remove stationary or slow-moving wall information. The wall estimator generates an estimate of the wall frequency; the I and Q data are delayed to match the delay through the wall estimator, and mixed with the wall frequency estimate. The result is that the wall information is centered about zero frequency. The flow estimator works as before to produce estimates of the flow parameters. In addition, the wall parameters are used to select whether adaptive mode should be enabled. A variation on the adaptive mode is also provided; this variation improves the detectability of low-flow-velocity signals by correlating over multiple time periods.

The wall estimator 62 processes the range cell information, read from the corner turner memory, into estimates of the wall parameters (velocity, power, variance). These values are used by the flow estimator in adaptive mode to produce a composite color flow estimate output.

The mixer 60 processes the raw firing data as selected by the wall estimator adaptive logic. In non-adaptive mode, or in adaptive mode with adapt off, the data is passed without change. In adaptive mode with adapt on, the wall frequency is used to mix the data so the wall component is at DC. This allows filtering of the wall signal with a real, rather than a complex, FIR filter.

The flow estimator 64 filters and processes the range cell information, read from the corner turner memory, into estimates of the flow parameters (velocity, power, variance). These estimates, together with the wall parameters derived by the wall estimator, produce final velocity, power, and variance estimates.

The autocorrelation algorithm is used to estimate the mean Doppler shift and variance directly. The real and complex autocorrelation between data from the adjacent firings is calculated and summed.

The autocorrelator receives I and Q data from the corner turner memory. Note that I corresponds to the "real" part and Q corresponds to the "imaginary" part. The correlator performs an autocorrelation estimate to generate N, D, and R(0). N and D are the numerator and denominator for the autocorrelation equation, as shown below:

$$N = \sum_{i=1}^{M-1} (I_i Q_{i+1} - I_{i+1} Q_i) \quad (1)$$

$$D = \sum_{i=1}^{M-1} (I_i I_{i+1} + Q_i Q_{i+1}) \quad (2)$$

where $I_i$ and $Q_i$ are the demodulated, basebanded input data for firing i, and M is the number of firings in the packet. The correlator ASIC actually computes −N instead of N; this results in computing the negative of the frequency later.

R(0) is approximated as a finite sum over the number of firings in a packet, as follows:

$$R(0) = \sum_{i=1}^{M-1} \frac{(I_i^2 + Q_i^2 + I_{i+1}^2 + Q_{i+1}^2)}{2} \quad (3)$$

The correlator ASIC actually computes 2R(0) instead of R(0) to make the normalizer calculation easier.

The output of the autocorrelator is normalized to take maximum advantage of the dynamic range of the Pythagoras processor. The normalizer examines the magnitude of the R(0) output and uses this to control the shift of all three outputs. The amount of shift is encoded and used later in the parameter estimator. An arithmetic shift is performed to preserve the sign of N and D.

A multiple lag autocorrelator can also be implemented, with the equations as follows:

$$N = \sum_{i=1}^{M-k} (I_i Q_{i+k} - I_{i+k} Q_i) \quad (4)$$

$$D = \sum_{i=1}^{M-k} (I_i I_{i+k} + Q_i Q_{i+k}) \quad (5)$$

$$R(0) = \sum_{i=1}^{M-k} \frac{(I_i^2 + Q_i^2 + I_{i+k}^2 + Q_{i+k}^2)}{2} \quad (6)$$

where k is the lag number, generally in a range from 1 to 4. The velocity output will also be scaled by the factor k; this is compensated later.

A Pythagoras processor converts N and D into a magnitude and phase for each range cell. The equations used are as follows:

$$|R(T)| = \sqrt{N^2 + D^2} \quad (7)$$

$$\phi(R(T)) = \tan^{-1}\left[\frac{N}{D}\right] \quad (8)$$

A cordic processor is used to ensure accuracy at ±π/2 (when D=0). The parameter estimator processes the magnitude and phase values into estimates of power, velocity and turbulence. The phase is used to calculate the mean Doppler frequency, which is proportional to the velocity as shown below; R(0) and |R(T)| (magnitude) are used to estimate the turbulence.

The mean Doppler frequency in hertz is obtained from the phase of N and D and the pulse repetition time T:

$$\bar{f} = \frac{1}{2\pi T} \tan^{-1}\left[\frac{N}{D}\right] = \frac{1}{2\pi T} (\phi(R(T))) \quad (9)$$

The mean velocity is calculated using the Doppler shift equation below. Since θ, the angle between the flow direction and the sampling direction, is not known, cos θ is assumed to be 1.0.

$$\bar{v} = \frac{\bar{f}}{f_0} \frac{c}{2\cos\theta} \quad (10)$$

Note that the parameter estimator does not calculate the mean Doppler frequency as an intermediate output, but calculates v directly from the phase output of the Pythagoras processor by using a lookup table.

The turbulence may be calculated in the time domain as a second-order series expansion of the variance of the mean Doppler frequency. The time domain expression for turbulence involves calculating the zero-lag and one-lag autocorrelation functions, R(0) and R(T) respectively. The exact autocorrelation functions are approximated by finite sums over the known data in the number of firings in a packet:

$$\sigma^2 = \frac{2}{(2\pi T)^2}\left[1 - \frac{|R(T)|}{R(0)}\right] \quad (11)$$

For multiple-lag autocorrelations, the velocity must be corrected to compensate for the added phase shift due to the multiple lags. In the wall calculation, this is done by a lookup table with fixed divide ratios from 1 to 4. The flow calculation is compensated in a changeable lookup table.

The mean value signal φ(R(T)) is an estimate of the mean Doppler frequency shift of the flowing reflectors, which in turn is proportional to the mean blood flow velocity. The variance signal σ indicates the frequency spread of the flow signal component of the baseband echo signal. This value is indicative of flow turbulence, since laminar flow has a very narrow range of velocities, while turbulent flow is a mixture of many velocities. To indicate the strength of the signal from the flowing reflectors, the signal R(0) indicates the amount of the returned power in the Doppler-shifted flow signal.

All calculations and parameter estimates with the exception of the Pythagoras processing are done with fixed lookup tables. The Pythagoras processor is a commercially available chip.

Figure 6:
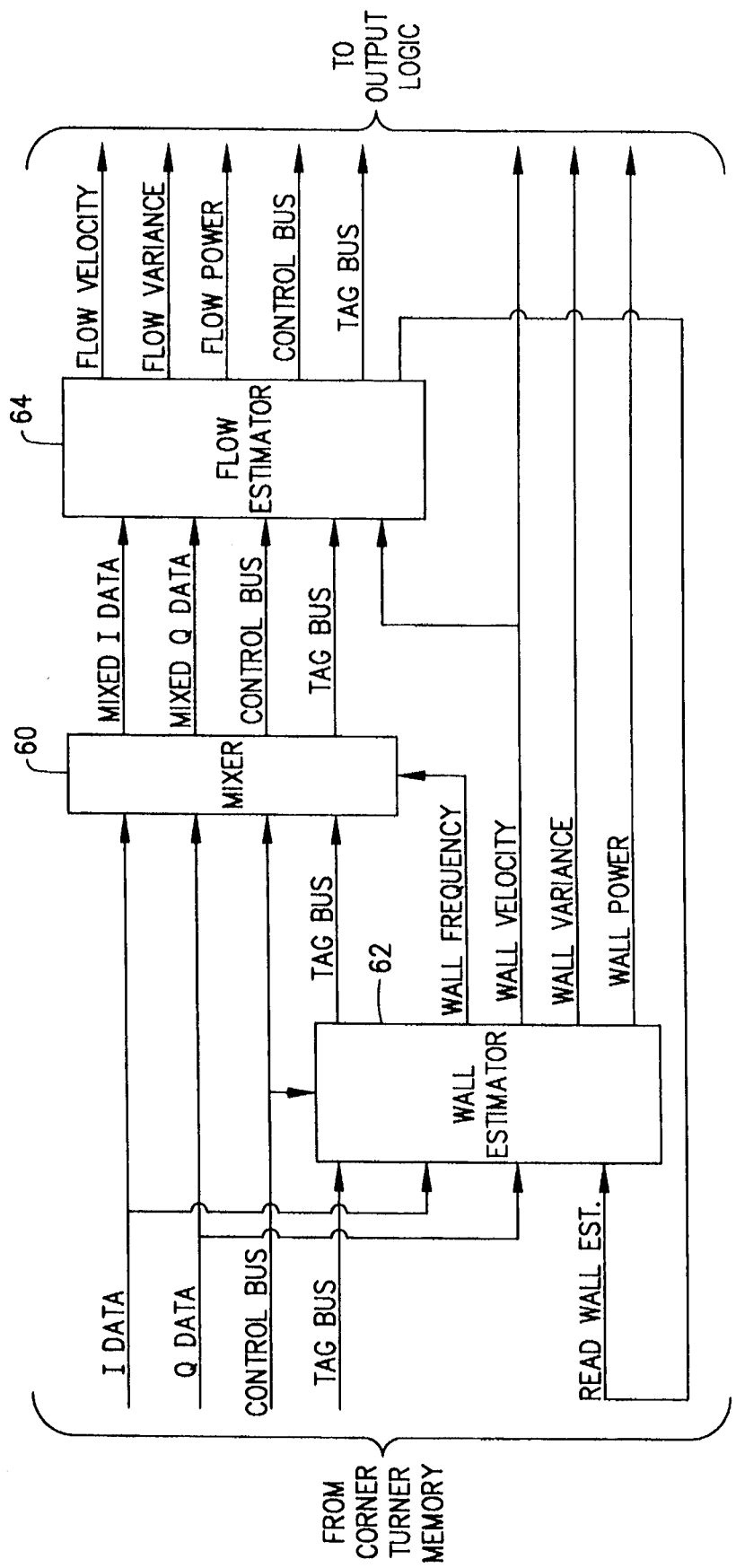
FIG. 6 is a block diagram of the color processor incorporated in the color flow processing system of FIG. 5.

The wall estimator 62 (see FIG. 6) operates only in the adaptive mode. This circuit processes the I and Q signals from the preprocessor into an estimate of the wall signal frequency. This estimate is used to mix the range cell information to DC in mixer 60 to eliminate the effects of slowly moving wall components, as would be caused by patient or transducer motion. The wall parameters are also sent to the flow estimator 64 to correct the estimates for the result of the mixing. This wall estimator is similar in concept to the flow estimator, except that no wall filter is needed.

The wall estimator is shown in detail in FIG. 7. The I and Q data is input to an autocorrelator 76 and then to first and second parameter estimators 78 and 80. Blocks 78 and 80 estimate the parameters of the wall signal as described above. The frequency of the wall signal is passed to the complex frequency generator in the mixer, to be used to mix the wall signal to DC. The wall parameters are also sent to the flow estimator for use in the flow calculations, and to the output logic 56 (in FIG. 5) for display. FIFO memories 82 are used to store the wall parameters to allow delay matching with the data as it passes through the flow estimator.

Figure 7A:
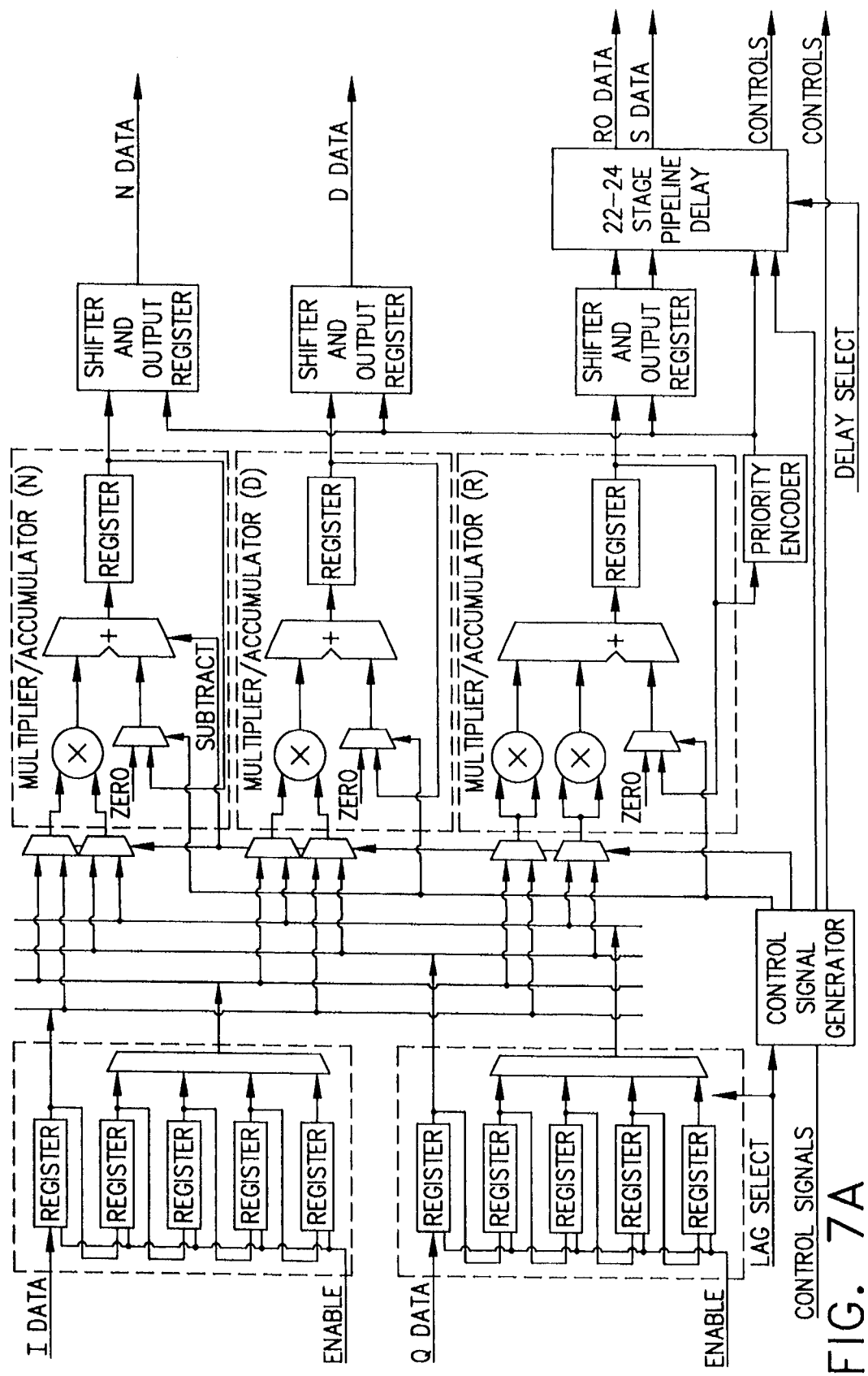

The wall correlator/normalizer 76 (see FIG. 7) is implemented in the correlator ASIC depicted in FIG. 7A. The I and Q data is first registered and delayed to generate $I_i$, $Q_i$, $I_{i-1}$ and $Q_{i-1}$. For single lag, the multiplexer on the register outputs selects the first register; for multilag correlations, the multiplexer selects the second, third or fourth register. These signals are then multiplexed into the multiplier/accumulators in the proper order to implement the autocorrelation equations given above. The output of the R accumulator is sent to a priority encoder, which finds the most significant "1" bit in the multi-bit result. Since R is always a positive number, this determines the amount of shift needed to normalize all the outputs. The shift value S is sent to the three arithmetic shifters, which produce three outputs (N, D and R0). The N and D buses are output directly; the R0 and S buses are delayed by a selectable number of clock cycles to match the delay through the external Pythagoras processor. The control signal generator receives the external control signal bus and generates all internal control signals. In addition, it generates a different set of external control signals that are used by the Pythagoras processor and divider, the delay FIFOs and other circuits in the wall estimator.

Figure 7B:
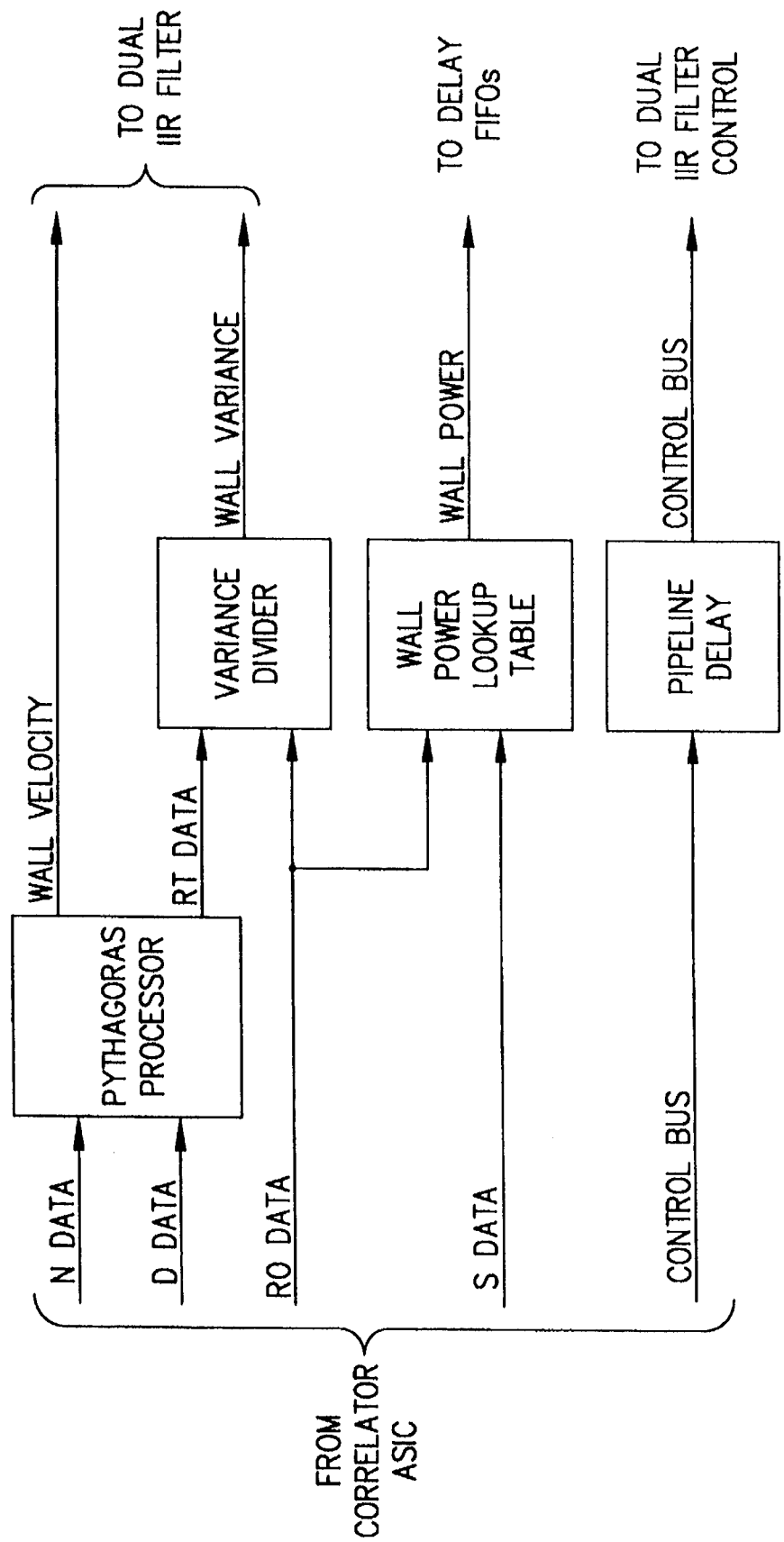

The wall variance, power and velocity calculation block 78 (see FIG. 7) consists of a Pythagoras processor, a variance divider and a wall power denormalizer as seen in FIG. 7B. The Pythagoras processor converts the rectangular coordinates of N and D to polar coordinates of magnitude R(T) and phase (velocity). The variance divider produces a wall variance output equal to R(T)/R(0). This divider is implemented with an integer divider. The pipeline delay for the Pythagoras processor is matched inside the correlator ASIC (see FIG. 7A). The pipeline delay for the integer divider is matched inside the dual IIR filter ASIC (see FIG. 8). The wall power denormalizer is implemented with a PROM lookup table.

Figure 7C:
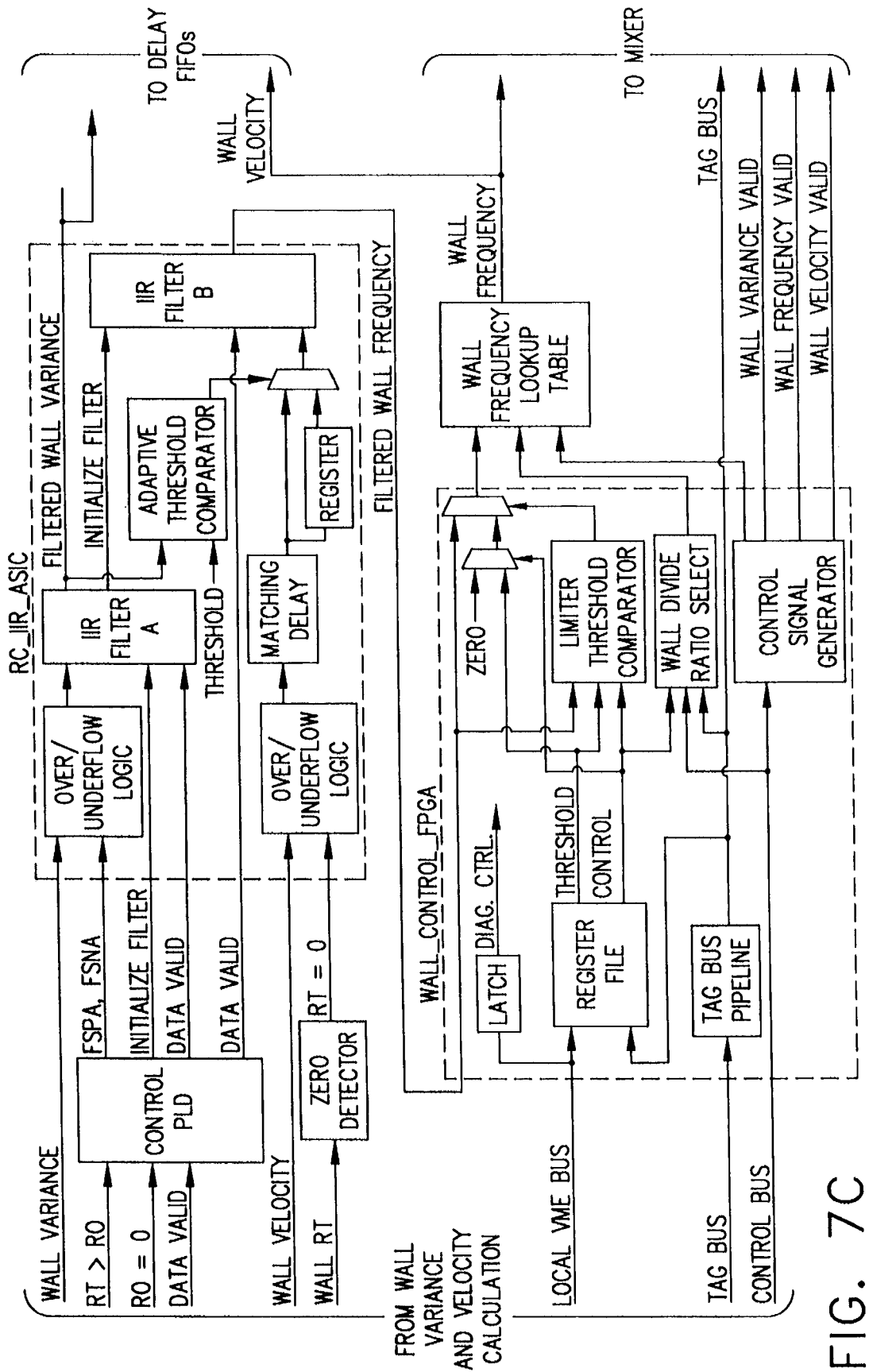

The wall frequency calculation block (80 in FIG. 7) is shown in detail in FIG. 7C. The wall frequency calculation block consists of a first IIR filter for the wall variance, a second IIR filter for the wall velocity, an adaptive mode selector and a wall frequency threshold detector. The first and second IIR filters have different filter coefficients. The wall variance is filtered and then compared with a threshold. The filtered wall variance is also passed to the output logic for further use. If the wall variance (at this point, 1- $\sigma^2$) is less than the threshold, then the adaptive mode is enabled. If the adaptive mode is enabled, the corresponding wall velocity data is filtered in the second IIR filter. If the adaptive mode is disabled, the incoming wall velocity data is discarded, that is, the input latch of the filter is not enabled. This approach results in discarding a sample that is considered too far out of range. Instead, the previous input value is held in the register, and the filter output moves toward the previous input value. The velocity filter output is then compared with a threshold value. If the velocity is greater than the threshold, the velocity is either limited to the threshold value or is set to zero. The wall velocity output is also set to zero if adaptive mode is disabled.

For multiple lag autocorrelations, the wall velocity must be scaled to compensate for the larger phase shift. This is accomplished by passing the limited wall velocity through a wall frequency lookup table that contains integer divisions from 1 to 4 for dividing the wall velocity by the lag value. The lookup table output is the desired wall frequency, which is sent to the mixer. The divide ratio is selected from the vector function type. Two wall estimates are performed for each range cell, both using the multiple lag setting. The first estimate is divided by the lag and output as the short-lag estimate. The second estimate is not divided and is output as the long-lag estimate. Both short-lag and long-lag estimates are stored in the FIFOS. This is done so the outputs of the FIFOs will track properly with the corresponding flow estimates.

Figure 8:
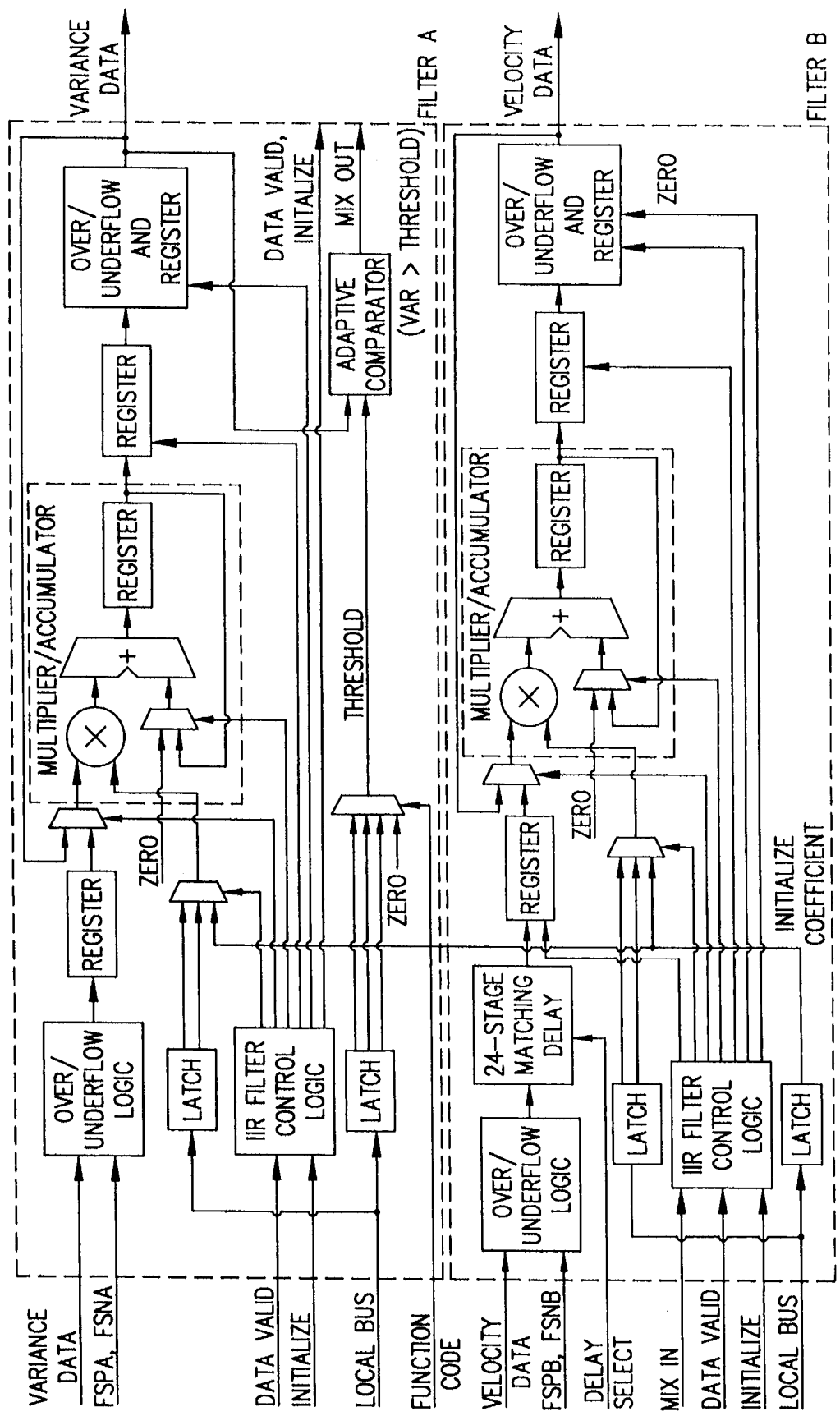
FIG. 8 is a block diagram for the dual IIR filter shown in FIG. 7C.

The dual IIR filter is implemented with the dual rate converter/dual IIR filter ASIC shown in FIG. 8. This device also contains threshold logic to control the operation of the velocity filter with the data from the wall variance. The dual IIR filter has a separate set of coefficients for the first data point in the vector. The first point is always filtered with an old value of zero, and the separate initialize coefficient allows setting the filter output to equal the new value, or some fraction of that value.

Bus access is provided mainly for diagnostic read of the wall parameters that are sent to the flow estimator and mixer, and for loading the IIR filter coefficients.

Figure 9:
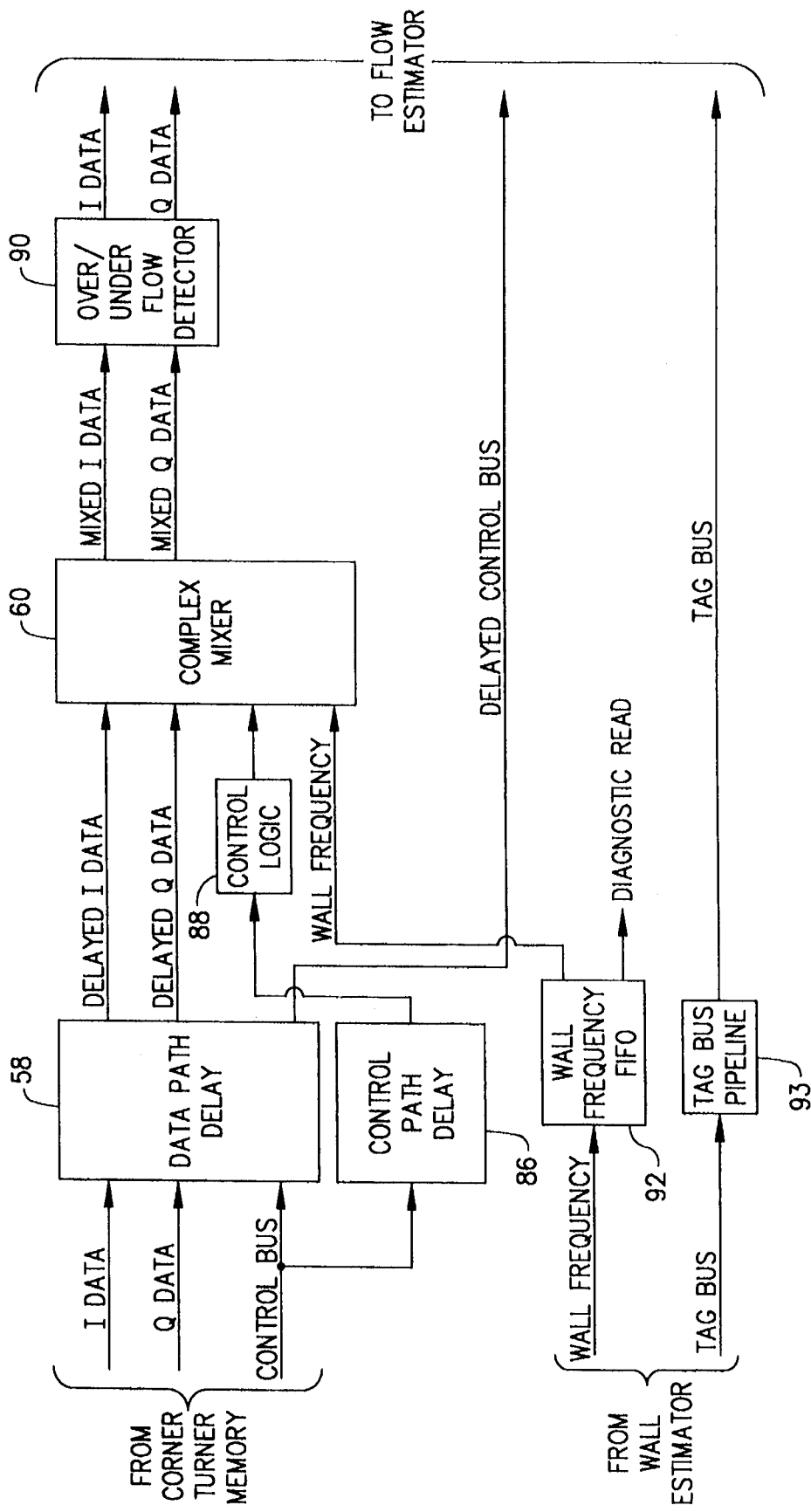
FIG. 9 is a block diagram of the delay/complex mixer incorporated in the color processor of FIG. 6.

As shown in FIG. 9, the I and Q data received from the corner turner memory is passed through a complex mixer 60. The complex mixer is used for the adaptive (low flow velocity) estimation, where the wall filter signal is mixed to DC. In the non-adaptive case, the frequency input is set to zero, and the complex mixer simply passes the incoming signal without modification.

In adaptive mode, the complex frequency generator 80 (see FIG. 7) accepts an input proportional to frequency, and generates I and Q signals that represent the wall frequency, which is output to the wall frequency FIFO 92 (see FIG. 9). This complex signal is multiplied in the complex mixer 60 by the incoming flow data to generate I and Q signals that have the wall signal mixed to DC. The incoming I and Q signals are delayed by the data path delay 58 to allow the wall estimator to compute the wall frequency that corresponds to the incoming data. The mixed I and Q signals are then passed through an over/under flow detector 90, which substitutes the maximum or minimum allowable magnitude for any magnitude which exceeds those allowable magnitudes.

The mixer block also contains a separate, shorter delay 86 for the control signals input to control logic 88. The shorter delay 86 allows the wall frequency to be read from the FIFO 92 and loaded before the corresponding I and Q data reaches the mixer. This compensates for differences in the pipeline delays for the data and the mixer frequency input.

The complex mixer is implemented with a numerically controlled oscillator/modulator. The delays are implemented with programmable pipeline delay shift registers (four for the data path delay and one for the control path delay).

The "real" data component arriving on the I bus goes to the "imaginary" inputs of the mixer; the "imaginary" component (on the Q bus) goes to the "real" inputs of the mixer. This is due to the combination of the definition of the mixer equations and the signal polarities defined in the color processor.

Bus access to the mixer is used to set the delay of the delay matching block.

Figure 10:
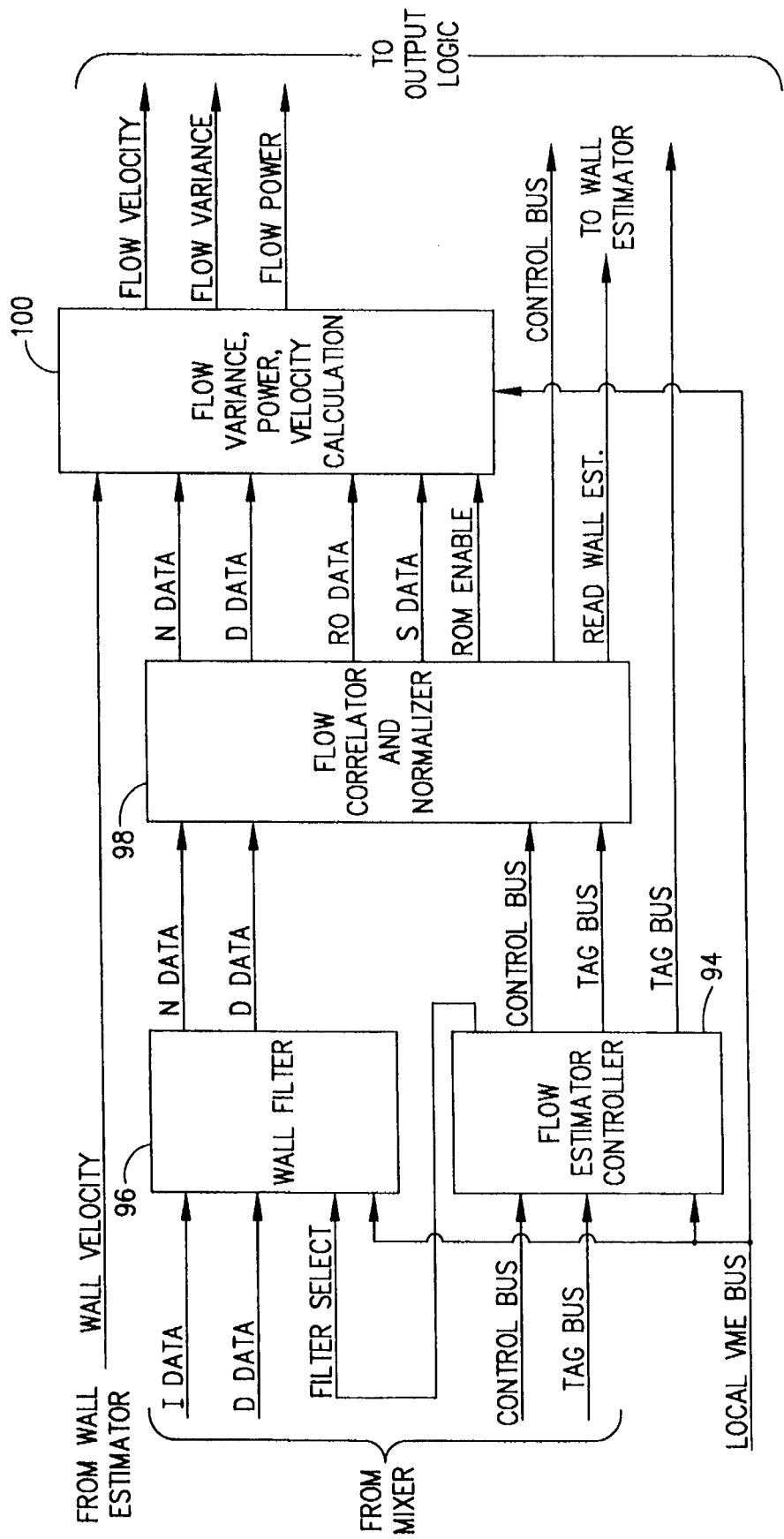
FIG. 10 is a block diagram of the flow estimator incorporated in the color processor of FIG. 6, with portions thereof being shown in greater detail in FIGS. 10A–10C.

Referring to FIG. 10, the flow estimator processes the I and Q signals into estimates of the flow parameters (power, velocity, variance, etc.). The output of the over/under flow detector 90 (see FIG. 9) is processed by a wall filter 96. This is a dual high-pass FIR filter that eliminates the wall signal without killing too much of the flow signal. Filter coefficients are stored in the coefficient memory inside the filter chip. Two different sets of coefficients can be stored at one time. The desired bank of coefficients is selected as a function of vector type, short lag or long lag mode (multilag only) and left or right pipe. The coefficients are loaded into the filter chips through the local bus.

The output of the wall filter 96 drives the flow autocorrelator/normalizer 98. Block 98 implements the algorithm set forth in Eqs. (1)–(3) under the control of flow estimator controller 94. The Pythagoras processor and parameter estimator in block 100 perform further processing according to the algorithm set forth in Eqs. (7)–(11).

The local bus access is used to load the wall filter coefficients and for diagnostic reads.

The wall filter is implemented with a programmable FIR filter. The flow autocorrelator is implemented with the previously described dual-purpose circuitry shown in FIG. 7A. The lookup tables other than the Pythagoras processor are implemented with EPROMs to reduce power and size.

Figure 10A:
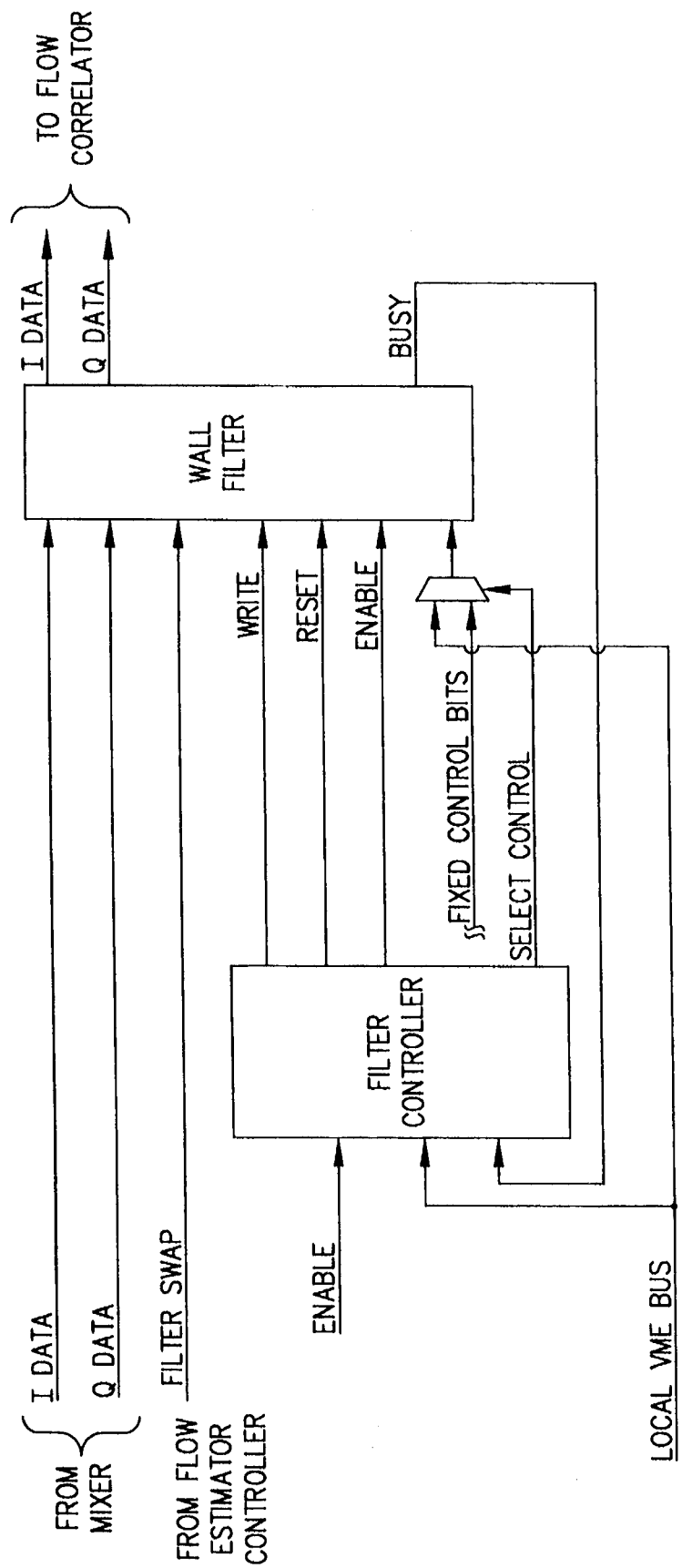

The circuitry for the wall filter 96 in FIG. 10 is shown in more detail in FIG. 10A. The wall filter block receives I and Q from the mixer and applies a 16-tap FIR filter. The FIR filter coefficients are programmable. Two banks of filter coefficients are provided. The desired bank is selected as a function of the incoming function code, left/right bank select and multilag high or low velocity estimate. The wall filter output is limited for over/underflow internally in the correlator ASIC. The filter controller generates the required reset sequence for the FIR filter chip, loads the fixed control bits into an internal control register and enables the filter for normal operation. Data synchronization is maintained by the logic in the flow estimator controller. After this process has been completed, coefficients are written from the local bus to the internal coefficient RAM. The outputs of the filter controller are delayed using silicon delay lines to meet the hold time requirements of the wall filter chip inputs.

Figure 10B:
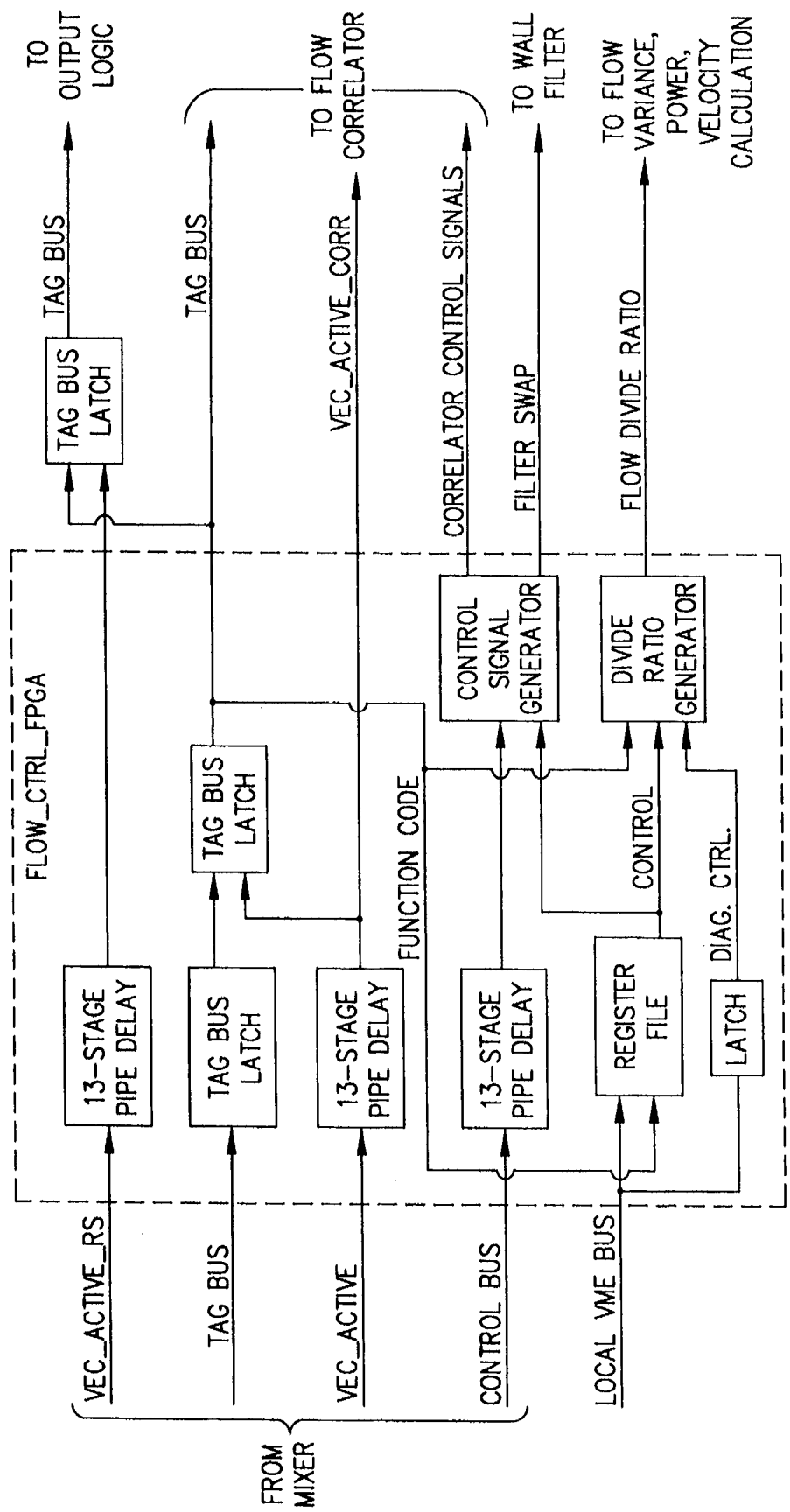

The flow estimator controller 94 in FIG. 10 is shown in more detail in FIG. 10B. The flow estimator controller receives the control and tag buses from the mixer and generates the required control signals for the correlator and other logic. The filter coefficient bank select for the wall filter is also generated here. The incoming signals are delayed by a number of clock cycles needed to compensate for the pipeline delays in the mixer section. The delayed signals are then sent to the control signal generator, which modifies the incoming signals by delaying the start of correlation until the data has passed through the wall filter. The number of taps in the filter can range between one (no filtering) and 16. The filter outputs may have contributions from one or more range cells. The flow estimator controller can delay the start of valid data to the correlator until the filter is entirely filled with data from one range cell.

Figure 10C:
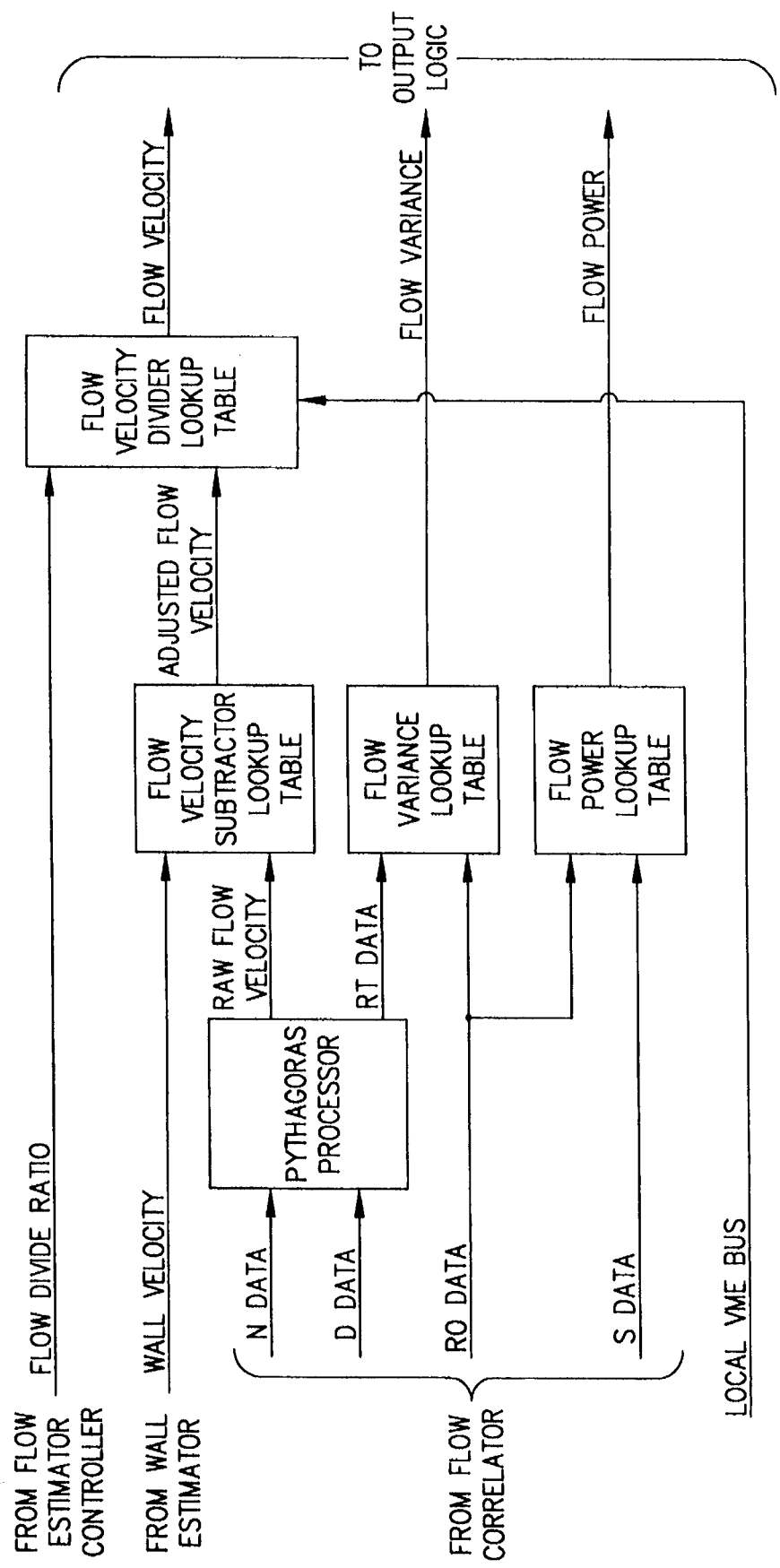

The flow variance, power and velocity calculation block 100 in FIG. 10 is shown in more detail in FIG. 10C. First, the N and D data is converted to polar coordinates by the previously described Pythagoras processor to yield a raw flow power (magnitude) and velocity (phase). The outputs are delayed by a predetermined number of clock cycles from the inputs. The R and S outputs from the correlator are delayed by the number of clock cycles needed to match this pipeline delay. The raw flow velocity is added to the wall velocity to compensate for the frequency subtraction performed by the mixer. In non-adaptive modes, the wall velocity is set to zero, and the adder simply passes the raw flow velocity. The adjusted flow velocity is then passed through a lookup table to divide the velocity by the lag value (either 1, 2, 3 or 4 for multilag mode; always 1 for single lag mode). In multilag mode, the high-velocity estimate is processed first, since the first value stored in the wall velocity FIFO corresponds to the divided wall velocity. These calculations are implemented using lookup tables. All but the flow velocity divider are fixed in EPROMs. The flow velocity divider is a RAM to allow a nonlinear lookup table if required.

The output logic block 56 (see FIG. 5) receives an estimate of power, velocity, and turbulence from the color processor. The output logic includes a field programmable gate array which selects the parameters to be displayed. For B mode, the vector number and other tag information is added to the selected parameters, and sent to the color acoustic line memory board (not shown) for further processing. An output enable is provided to allow the cine board (not shown) to disable the color flow processor output and inject previously acquired cine information for playback. For M mode, the vector data is accumulated in a FIFO. The outputs are sent to the timeline processor (not shown) when requested. If an M vector is not requested by the timeline processor by the time another one arrives, the old vector is dumped. An output enable is provided to allow the cine board to disable the color flow processor output and inject previously acquired cine information. Filtering provided by the output logic block includes a median filter for M mode data. The B mode "hole filler" is implemented on the color acoustic line memory.

The foregoing preferred embodiment has been disclosed for the purpose of illustration. Variations and modifications of that concept will be readily apparent to those skilled in the art of ultrasound color flow imaging. All such variations and modifications are intended to be encompassed by the claims set forth hereinafter.

I claim:

1. A processor for color flow imaging of the velocity of scatterers flowing past slowly moving tissue, comprising:

means for supplying basebanded signals derived from ultrasound reflected by the scatterers and by the tissue;

a wall estimator for processing said basebanded signals to output a wall frequency signal representing an estimated mean Doppler frequency produced by the slowly moving tissue and a wall velocity signal representing an estimated velocity of the slowly moving tissue;

mixing means for mixing said basebanded signal using said wall frequency signal so that the wall component is at DC and then outputting the mixed basebanded signals; and a flow estimator for processing said mixed basebanded signals and said wall velocity signal in an adaptive mode to output a flow velocity signal representing an estimated flow velocity of the scatterers which compensates for movement of the slowly moving tissue, wherein said wall estimator comprises:

means for correlating basebanded signals to output signals representing first, second and third autocorrelation parameters;

a processor for outputting signals representing wall velocity and a magnitude of a fourth autocorrelation parameter in response to receipt of said signals representing said first and second autocorrelation parameters from said correlating means;

a first filter for receiving said signal representing wall velocity;

means for outputting a signal representing wall frequency in response to receipt of the filtered wall velocity signal from said first filter;

a variance divider for outputting a signal representing the wall variance in response to receipt of said signal representing said third autocorrelation parameter from said correlating means and said signal representing said magnitude of said fourth autocorrelation parameter from said processor;

means for outputting a signal representing wall power; and threshold logic means for controlling operation of said first filter as a function of said wall variance signal or said wall power signal or a combination thereof.

2. The color flow processor as defined in claim 1, further comprising a second filter for receiving said wall variance signal, wherein said threshold logic means controls operation of said first filter as a function of said filter wall variance signal.

3. A processor for color flow imaging of the velocity of scatterers flowing past slowly moving tissue, comprising:

means for supplying basebanded signals derived from ultrasound reflected by the scatterers and by the tissue;

a wall estimator for processing said basebanded signals to output a wall frequency signal representing an estimated mean Doppler frequency produced by the slowly moving tissue and a wall velocity signal representing an estimated velocity of the slowly moving tissue;

mixing means for mixing said basebanded signal using said wall frequency signal so that the wall component is at DC and then outputting the mixed basebanded signals; and a flow estimator for processing said mixed base-banded signals and said wall velocity signal in an adaptive mode to output a flow velocity signal representing an estimated flow velocity of the scatterers which compensates for movement of the slowly moving tissue, wherein said flow estimator comprises a wall filter connected to receive the mixed basebanded signals from said mixer, said wall filter having first and second selectable banks of filter coefficients.

4. The color flow processor as defined in claim 3, wherein said wall estimator comprises means for correlating basebanded signals to output signals representing first, second and third autocorrelation parameters.

5. The color flow processor as defined in claim 2, wherein said wall estimator further comprises a processor for outputting signals representing wall velocity and a magnitude of a fourth autocorrelation parameter in response to receipt of said signals representing said first and second autocorrelation parameters from said correlating means.

6. The color flow processor as defined in claim 5, wherein said wall estimator further comprises:

a first filter for receiving said signal representing wall velocity; and means for outputting a signal representing wall frequency in response to receipt of the filtered wall velocity signal from said first filter.

7. The color flow processor as defined in claim 6, wherein said wall estimator further comprises:

a variance divider for outputting a signal representing the wall variance in response to receipt of said signal representing said third autocorrelation parameter from said correlating means and said signal representing said magnitude of said fourth autocorrelation parameter from said processor; and means for outputting a signal representing wall power.

8. The color flow processor as defined in claim 3, wherein said flow estimator comprises means for correlating the filtered mixed basebanded signals to output signals representing first, second and third autocorrelation parameters.

9. The color flow processor as defined in claim 8, wherein said flow estimator further comprises a processor for outputting signals representing raw flow velocity and a magnitude of a fourth autocorrelation parameter in response to receipt of said signals representing said first and second autocorrelation parameters from said correlating means.

10. The color flow processor as defined in claim 9, wherein said flow estimator further comprises:

means for outputting a signal representing flow variance in response to receipt of said signal representing said third autocorrelation parameter from said correlating means and said signal representing said magnitude of said fourth autocorrelation parameter from said processor.

11. The color flow processor as defined in claim 9, wherein said flow estimator further comprises means for outputting a signal representing adjusted flow velocity in response to receipt of said signal representing wall velocity from said wall estimator and said signal representing raw flow velocity from said processor.

12. The color flow processor as defined in claim 11, wherein said flow estimator further comprises means for outputting a signal representing adjusted flow velocity divided by the lag value.

13. A wall estimator for outputting a wall velocity signal representing an estimated velocity of slowly moving tissue in response to receipt of basebanded signals derived from ultrasound reflected by the tissue, comprising:

means for correlating the basebanded signals to output signals representing first, second and third autocorrelation parameters;

a processor for outputting signals representing wall velocity and a magnitude of a fourth autocorrelation parameter in response to receipt of said signals representing said first and second autocorrelation parameters from said correlating means;

a first filter for receiving said signal representing wall velocity;

means for outputting a signal representing wall frequency in response to receipt of the filtered wall velocity signal from said first filter;

a variance divider for outputting a signal representing the wall variance in response to receipt of said signal representing said third autocorrelation parameter from said correlating means and said signal representing said magnitude of said fourth autocorrelation parameter from said processor; and threshold logic means for controlling operation of said first filter as a function of said wall variance signal or said wall power signal or a combination thereof.

14. The wall estimator as defined in claim 13, further comprising a second filter for receiving said wall variance signal, wherein said threshold logic means controls operation of said first filter as a function of said filter wall variance signal.

* * * * *